US010504151B2

(12) United States Patent
Wang et al.

(10) Patent No.: US 10,504,151 B2
(45) Date of Patent: Dec. 10, 2019

(54) ADVERTISING INVENTORY MANAGEMENT SYSTEM AND METHOD

(71) Applicant: Disney Enterprises, Inc., Burbank, CA (US)

(72) Inventors: Yiqing Wang, Bothell, WA (US); John Dietz, Redmond, WA (US); Janet Schertzinger, Edmonds, WA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 515 days.

(21) Appl. No.: 15/239,345

(22) Filed: Aug. 17, 2016

(65) Prior Publication Data

US 2016/0358232 A1 Dec. 8, 2016

Related U.S. Application Data

(62) Division of application No. 12/191,199, filed on Aug. 13, 2008, now abandoned.

(51) Int. Cl.
*G06Q 30/00* (2012.01)
*G06Q 30/02* (2012.01)
(Continued)

(52) U.S. Cl.
CPC ....... *G06Q 30/0264* (2013.01); *G06Q 10/087* (2013.01); *G06Q 30/02* (2013.01);
(Continued)

(58) Field of Classification Search
CPC .................................................. G06Q 30/0251
(Continued)

(56) References Cited

U.S. PATENT DOCUMENTS 6,990,462 B1 1/2006 Wilcox et al.
7,136,871 B2 11/2006 Ozer et al.
(Continued)

OTHER PUBLICATIONS

Author Unknown, "Inventory Manager: Business Challenges", http://www.rapt.com/solutions/inventory_manager.htm (at least as early as May 15, 2008), 2 pages.
(Continued)

*Primary Examiner* — Matthew L Hamilton
(74) *Attorney, Agent, or Firm* — Dorsey & Whitney LLP

(57) ABSTRACT

A method of managing advertisement inventory in an internet advertising system is provided. The method comprises forecasting advertisement capacity using a plurality of predefined advertisement targeting parameters arranged in a tree structure to define a plurality of buckets, wherein each bucket is associated with a combination of the predefined advertisement targeting parameters. The method further comprises matching sold advertisement data with at least one of the plurality of predefined advertisement targeting parameters in the tree structure. The method further comprises determining available advertisement inventory by the inventory management system for the at least one predefined parameter by reducing the forecasted advertisement capacity by the matched sold advertisement data. The method further comprises delivering advertisements by an ad server to display devices associated with internet users who match the combination of predefined advertising targeting parameters of at least one bucket.

11 Claims, 7 Drawing Sheets

(51) Int. Cl.
G06Q 10/08 (2012.01)
G06Q 30/06 (2012.01)

(52) U.S. Cl.
CPC ..... *G06Q 30/0251* (2013.01); *G06Q 30/0253* (2013.01); *G06Q 30/0277* (2013.01); *G06Q 30/0601* (2013.01)

(58) Field of Classification Search
USPC .......................................................... 705/14
See application file for complete search history.

(56) References Cited

U.S. PATENT DOCUMENTS

| | | | |
|---|---|---|---|
| 7,158,959 | B1 | 1/2007 | Chickering et al. |
| 7,356,547 | B2 | 4/2008 | Ozer et al. |
| 7,668,946 | B1 | 2/2010 | Garcia-Franco et al. |
| 2001/0047297 | A1* | 11/2001 | Wen ........................ G06Q 30/02 705/14.55 |
| 2002/0104083 | A1 | 8/2002 | Hendricks et al. |
| 2002/0133399 | A1 | 9/2002 | Main |
| 2003/0110171 | A1* | 6/2003 | Ozer ....................... G06Q 30/02 |
| 2003/0171990 | A1 | 9/2003 | Rao et al. |
| 2005/0050215 | A1 | 3/2005 | Lin et al. |
| 2005/0080878 | A1* | 4/2005 | Cunningham ......... G06Q 30/02 709/219 |
| 2006/0080171 | A1* | 4/2006 | Jardins ................. G06Q 10/087 705/14.68 |
| 2006/0287913 | A1 | 12/2006 | Baluja |
| 2007/0078711 | A1* | 4/2007 | Anand ................... G06Q 30/02 705/14.49 |
| 2007/0100796 | A1 | 5/2007 | Wang et al. |
| 2007/0179832 | A1 | 8/2007 | Reich |
| 2007/0271145 | A1 | 11/2007 | Vest |
| 2008/0195475 | A1 | 8/2008 | Lambert et al. |
| 2008/0275777 | A1 | 11/2008 | Protheroe et al. |
| 2009/0112691 | A1 | 4/2009 | Abrams et al. |
| 2009/0150198 | A1* | 6/2009 | Volovich ................ G06Q 30/02 705/7.32 |
| 2010/0042485 | A1 | 2/2010 | Wang et al. |
| 2010/0042496 | A1 | 2/2010 | Wang et al. |
| 2011/0251875 | A1* | 10/2011 | Cosman ............. G06Q 30/0202 705/7.31 |

OTHER PUBLICATIONS

Author Unknown, "Rapt Unveils Inventory Management Product for Media Industry", Rapt, Inc. (Sep. 25, 2006), 1 page.
Author Unknown, "Solutions", Rapt, Inc., http://rapt.com/solutions/index.htm (at least as early as May 15, 2008), 2 pages.
Crain, "Prediction and Provisioning: The New World of Inventory Management", Rapt, Inc. (Sep. 2006), 8 pages.
Digital Element, "IP Intelligence: Targeted Online Advertising", Digital Element, http://www.digital-element.com/ip_intelligence/targeted.html (at least as early as May 9, 2008), 2 pages.
Glaser, "Your Guide to Online Advertising", http://www.pbs.org/mediashift/2007/06/digging_deeperyour_guide_to_on.html, Jun. 27, 2007, 7 pages.
Google, "Ad Ranking", http://www.google.com/adwords/learningcenter/text/18722.html (at least as early as May 9, 2008), 1 page.
Google, "Google Learning Center: Basic AdWords Features", http://www.google.com/adwords/learningcenter/text/18912.html (at least as early as May 9, 2008), 3 pages.
Google, "Google Learning Center: Benefits of Adwords", http://www.google.com/adwords/learningcenter/text/28810.html (at least as early as May 9, 2008), 2 pages.
Google, "Google Learning Center: Creating a Placement-Targeted Campaign", http://www.google.com/adwords/learningcenter/text/20160.html (at least as early as May 9, 2008), 2 pages.
Google, "Google Learning Center: Google and Google AdWords", http://google.com/adwords/learningcenter/text/18911.html (at least as early as May 9, 2008), 2 pages.
Google, "Google Learning Center: Introduction", http://www.google.com/adwords/learningcenter/text/20130.html (at least as early as May 9, 2008), 2 pages.
Google, "Google Learning Center: Paying for AdWords", http://www.google.com/adwords/learningcenter/text/18719.html (at least as early as May 9, 2008), 2 pages.
Google, "Google to Provide Web Search and Targeted Sponsored Links to Walt Disney Internet Group Web Properties—Disney.com, FamilyFun.com, Go.com and Movies.com", http://www.google.com/press/pressre1/disney.html, Mar. 10, 2003, 2 pages.
Rapt, Inc., "Inventory Manager: Business Challenges", Rapt, Inc., Sep. 2007, 2 pages.
Shields, "Internet Advertising Inventory Management", http://www.basswood.com/ts/inventorymgt.html, Mar. 3, 2001, 2 pages.
Wikipedia, "AdWords", Wikipedia, http://en.wikipedia.org/wiki/AdWords (at least as early as May 9, 2008), 3 pages.
Wikipedia, "Online Advertising", Wikipedia, http://3n.wikipedia.org/wiki/OnlineAdvertising (at least as early as Aug. 13, 2008), 2 pages.
Wikipedia, "Yahoo! Search Marketing", http:en.wikipedia.org/wiki/Yahoo%21_Search_Market (at least as early as May 9, 2008), 3 pages.
U.S. Appl. No. 12/191,207, filed Aug. 13, 2008.

* cited by examiner

ADVERTISING INVENTORY MANAGEMENT SYSTEM AND METHOD

CROSS-REFERENCE TO RELATED APPLICATIONS

This application is a divisional application of U.S. patent application Ser. No. 12/191,199, entitled "ADVERTISING INVENTORY MANAGEMENT SYSTEM AND METHOD," filed Aug. 13, 2008, which is hereby incorporated by reference in its entirety for all purposes.

SCOPE OF THE INVENTION

The present invention relates to inventory management systems, and in particular advertising inventory management systems for use with internet advertising.

BACKGROUND

Internet or online advertising is well known and has become a commonly used advertising medium. Users who browse the Internet, or visit a specific website are often confronted with webpage advertisements, such as display ads, including for example, banner ads, skyscraper ads, and in-content ads. Various systems have been developed to deliver these advertisements to users.

Advertisers who use this web-based medium of advertisement are confronted with a number of pricing models. For example, in the cost-per-thousand or CPM pricing model, the advertiser pays a fixed amount to the publisher every time an advertisement is displayed. Typically, in this scenario advertisers assume all or a majority of the risk, as the publisher is guaranteed revenue per impression regardless of the effectiveness of the advertisement. Performance-based models also exist. In these models, some or most of the risk is placed on the publisher, as the advertiser pays the website only when a customer takes some action in response to the advertisement. Common examples of performance-based models are a fixed amount per click, a fixed amount per purchase, or a fixed percentage of the purchase price for each purchase.

Due to the relatively high level of risk in both models, advertisers and publishers or website operators desire to maximize revenue by directing advertisements to consumers who are likely to purchase the particular product or service advertised. Thus, advertisements are targeted to consumers with specific characteristics. Targeting of advertisements is well known and occurs, generally, by identifying or characterizing a demographic of consumers most likely to be a consumer of the product or service, and delivering the ad to that characterized group or individual. Targeted advertisements may be sold at any time to advertisers. Targeted advertisements may be used by publishers to free up advertising space, as the advertisements are not blanketed across the internet or several internet sites, but instead are strategically delivered at specific moments based upon certain triggering events or parameters. Moreover, targeted advertisements are more expensive. Thus, there is an incentive for sales teams to sell targeted advertising as it provides a better return on investment.

Advertisers typically desire to deliver a specific number of impressions of the advertisement to the targeted consumer and often enter contracts with the publisher to achieve this goal. Unfortunately, targeted advertisements, because of the numerous parameters involved in targeting the advertisement, are difficult to forecast, as each parameter must be forecast to determine capacity. The entity responsible for serving the advertisements must constantly manage a large amount of advertisement inventory, much of which is very specific in terms of delivery criteria. Moreover, sold advertisement data from the contractual obligations is also hard to calculate and manage, as targeted ads may be sold down to extremely narrow parameters for ad delivery. Therefore, sales systems and individuals have a difficult time determining the capacity of the system or available inventory, to be able to guarantee a particular level of impressions in a contract. In light of the numerous variables involved in internet advertising, a common problem is that it is easy to sell advertising space beyond the available capacity of the site or under the capacity of the site. Thus, advertisers risk paying for advertising space which is never filled and owners of ad space or publishers risk not fulfilling their contractual obligations as well as underselling, and thus not maximizing the revenue from a particular website.

Accordingly, what is needed in the art is an inventory management system that manages the advertisement inventory with precision and may be queried for an accurate determination of available inventory for sale.

SUMMARY

A method of managing advertisement inventory in an internet advertising system is provided. The method comprises forecasting, by a processor, advertisement capacity using a plurality of predefined advertisement targeting parameters arranged in a tree structure to define a plurality of buckets, wherein each bucket is associated with a combination of the predefined advertisement targeting parameters. The method further comprises matching, by the processor, sold advertisement data with at least one of the plurality of predefined advertisement targeting parameters in the tree structure. The method further comprises determining, by the processor, available advertisement inventory by the inventory management system for the at least one predefined parameter by reducing the forecasted advertisement capacity by the matched sold advertisement data. The method further comprises delivering, by the processor, advertisements by an ad server to display devices associated with internet users who match the combination of predefined advertising targeting parameters of at least one bucket.

A method of managing advertisement inventory in an internet advertising system is provided. The method comprises defining a plurality of buckets, wherein each bucket of the plurality of buckets is associated with one or more targeted advertising parameters. The method further comprises analyzing historical data associated with the one or more targeted advertising parameters to determine a forecast capacity for each bucket of the plurality of buckets. The method further comprises extracting sold advertisement data from a plurality of contractual obligations. The method further comprises associating an advertisement with one or more buckets of the plurality of buckets based, at least in part, on the forecast capacity and the sold advertisement data. The method further comprises delivering the advertisement for display on a display device associated with an internet user responsive to the internet user matching the one or more targeted advertising parameters.

An advertisement inventory management system for internet advertising is provided. The system comprises an ad server including a delivery engine capable of delivering an advertisement to a web server for display in a webpage in response to a triggering event by an internet user. A configuration module may be provided in functional communication with the delivery engine. The configuration module may be adapted to schedule an advertisement for delivery by the delivery engine. The configuration module may also be capable of communicating the advertisement to the delivery engine according to the schedule. The advertisement management system may also include an inventory management system having a plurality of advertisement targeting parameters arranged in a tree structure. The inventory management system may be adapted to forecast capacity of possible advertisement impressions of the plurality of advertisement targeting parameters and to match the advertising target parameters at a branch of the tree structure with sold advertisement data to identify advertisement inventory for the branch of the tree structure. The inventory management system may also be in communication with the configuration module so as to identify an advertisement from the advertisement inventory for delivery to an internet user satisfying the advertisement targeting parameters.

A further advertisement inventory system for internet advertising is provided. The system comprises an ad server in functional communication with a delivery engine capable of delivering an advertisement to a web server for display in a webpage and a configuration module in functional communication with the delivery engine. The configuration module may be adapted to schedule an advertisement for delivery by the delivery engine. The configuration module may also be capable of communicating the advertisement to the delivery engine according to the schedule. The advertisement inventory system may also include an inventory management system having a plurality of advertisement targeting parameters arranged in a tree structure, the inventory management system being adapted to forecast capacity of possible advertisement impressions of the plurality of advertisement targeting parameters and to match the advertising target parameters at a branch of the tree structure with sold advertisement data to identify advertisement inventory for the branch of the tree structure. The inventory management system may be in communication with the configuration module to identify an advertisement from the advertisement inventory for delivery. A sales system may also be provided in functional communication with the inventory management system adapted to query the inventory management system for available advertisement inventory.

A method of managing advertisement inventory in an internet advertising system is also disclosed. The method comprises using a plurality of pre-defined advertisement targeting parameters arranged in a tree structure to forecast advertisement capacity. The method also may include matching sold advertisement data with the at least one pre-defined parameter in the tree structure and determining available advertisement inventory for the at least one pre-defined parameter by reducing the forecast advertisement capacity by the matched sold advertisement data. The method may also include using the available inventory to deliver advertisements to internet users who match the at least one pre-defined parameter and to sell advertising space on the internet advertising system.

In an exemplary embodiment of the advertising inventory management system described, the advertisement inventory may be managed at the targeting level, thereby providing a level of precision in the determination of contractual obligations which are fulfilled as well as the advertising space available which may be available for ad delivery. The system interacts at both the user level and the sales level to direct, establish, and monitor inventory use and availability with a level of precision. Other advantages and features may become apparent from the following description, drawings, and claims.

DETAILED DESCRIPTION

Figure 1:
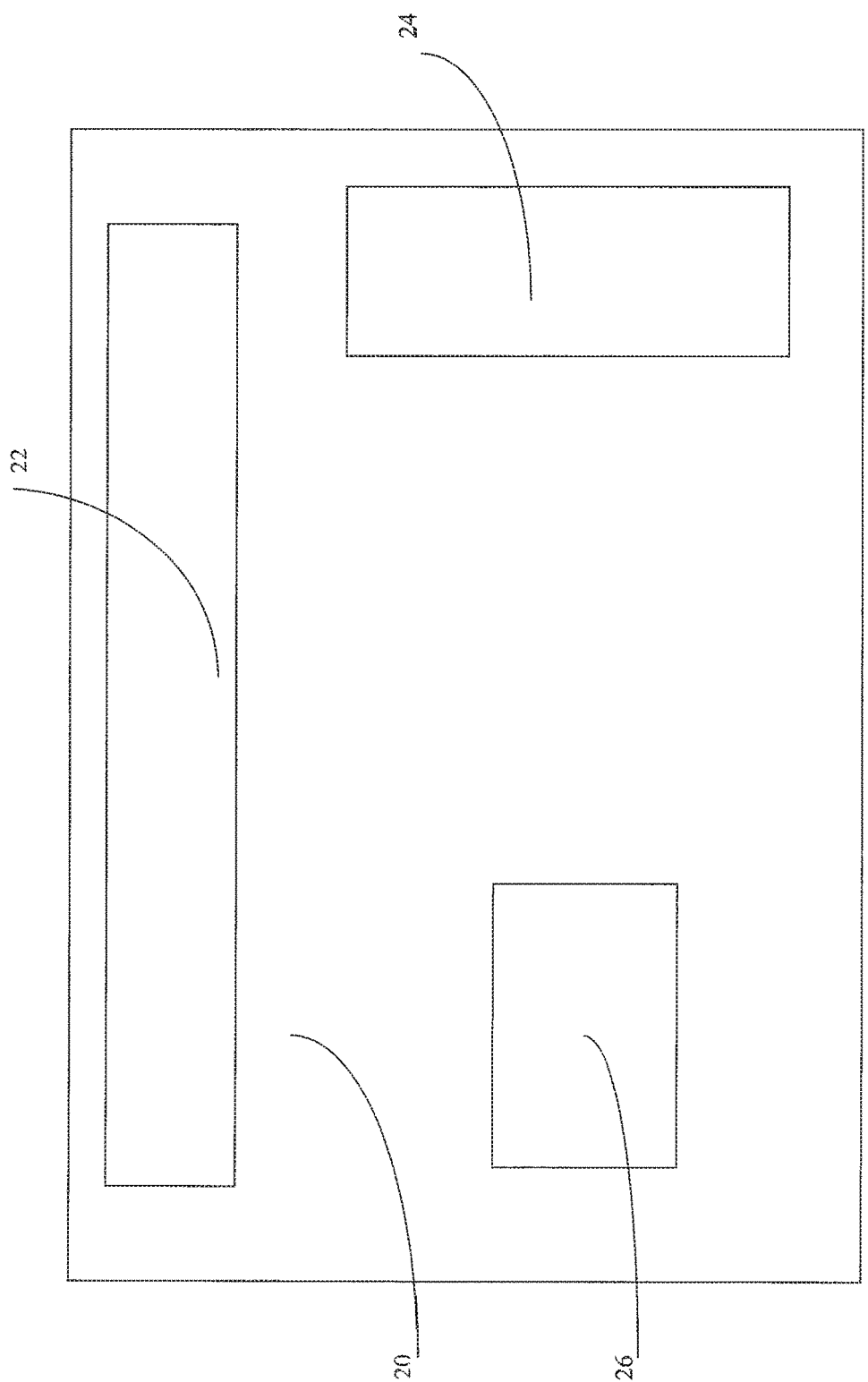
FIG. 1 is an exemplary internet webpage showing representative advertisement placement locations.

The invention is generally directed to an inventory management system for use with internet advertisements. More specifically, the present invention is a management system of advertisements available for online display when requested by a webpage, such as a homepage. The management system may also be accessed by sales people for a determination regarding advertisement space that may be sold. The system is generally a system used to manage advertisements to be displayed on one or more webpages. The inventory management system may be operated by a website owner or a third party.

The system manages the inventory of advertisements used and delivers the ads in the form of advertising impressions to devices that may be operatively connected, or intermittently connected to a network. The delivery of an advertisement or advertisement content to a user in an embodiment of the present invention includes the selection of the advertisement as it relates to forecasted inventory and the contractual obligations for display of advertisements. The inventory management system may be configured to operate in real time, although such an arrangement is not required.

The system herein may be operated by computer-executable instructions, such as program modules, executable on a computer. Program modules may include routines, programs, objects, components, data structures and the like which perform particular tasks or implement particular instructions. The computers in association for use with the system and various components described herein may be programmable computers which may be special purpose computers or a general purpose computers that execute the system according to the relevant instructions. Other computer system configurations may also be acceptable, including hand-held devices, cell phones, PDAs, mobile devices, multiprocessor systems, microprocessor-based or programmable electronics, network PC's, minicomputers, mainframe computers, and the like. Preferably, the computing system chosen includes a processor suitable in size to efficiently operate one or more of the various systems or functions of the invention. The system or portions thereof may also be linked to a distributed computing environment, where tasks are performed by remote processing devices that are linked through a communications network. To this end, the system may be configured or linked to multiple computers in a network, including, but not limited to a local area network, a wide area network, a wireless network, and the Internet. Therefore, information and data may be transferred within the network or system by wireless means, by hardwire connection or combinations thereof. Furthermore, the computer or computers may be operatively or functionally connected to one or more mass storage devices, such as, but not limited to a database. The system may also include computer-readable media which may include any computer readable media or medium that may be used to carry or store desired program code that may be accessed by a computer.

The inventory management system is suitable for use in managing advertisements for delivery with various internet advertising systems, including but not limited to, traditional online advertising systems, cell phone advertising systems, online streaming video systems or video advertisements, and even off-line advertising systems. In such systems, advertisements are displayed in or on a webpage in association with the webpage content. A sample internet webpage 20 is provided in FIG. 1, illustrating common placement locations of advertisements. Advertisement locations in FIG. 1 include a banner advertising location 22, a skyscraper advertising location 24, and an in-content advertising location 26. These advertising locations may include one or more advertisements. Each of these advertising locations constitute a space which may be sold to internet advertisers. Furthermore, typical internet advertising systems serve ads, which may be new ads, each time the webpage is accessed or refreshed. Thus, the webpage includes changeable ad content and may result in one or more impressions per visit to the webpage. Each impression, charged as CPM, of an ad may likewise be sold to internet advertisers. Advertising space may also be sold based upon click-through counts.

Figure 2:
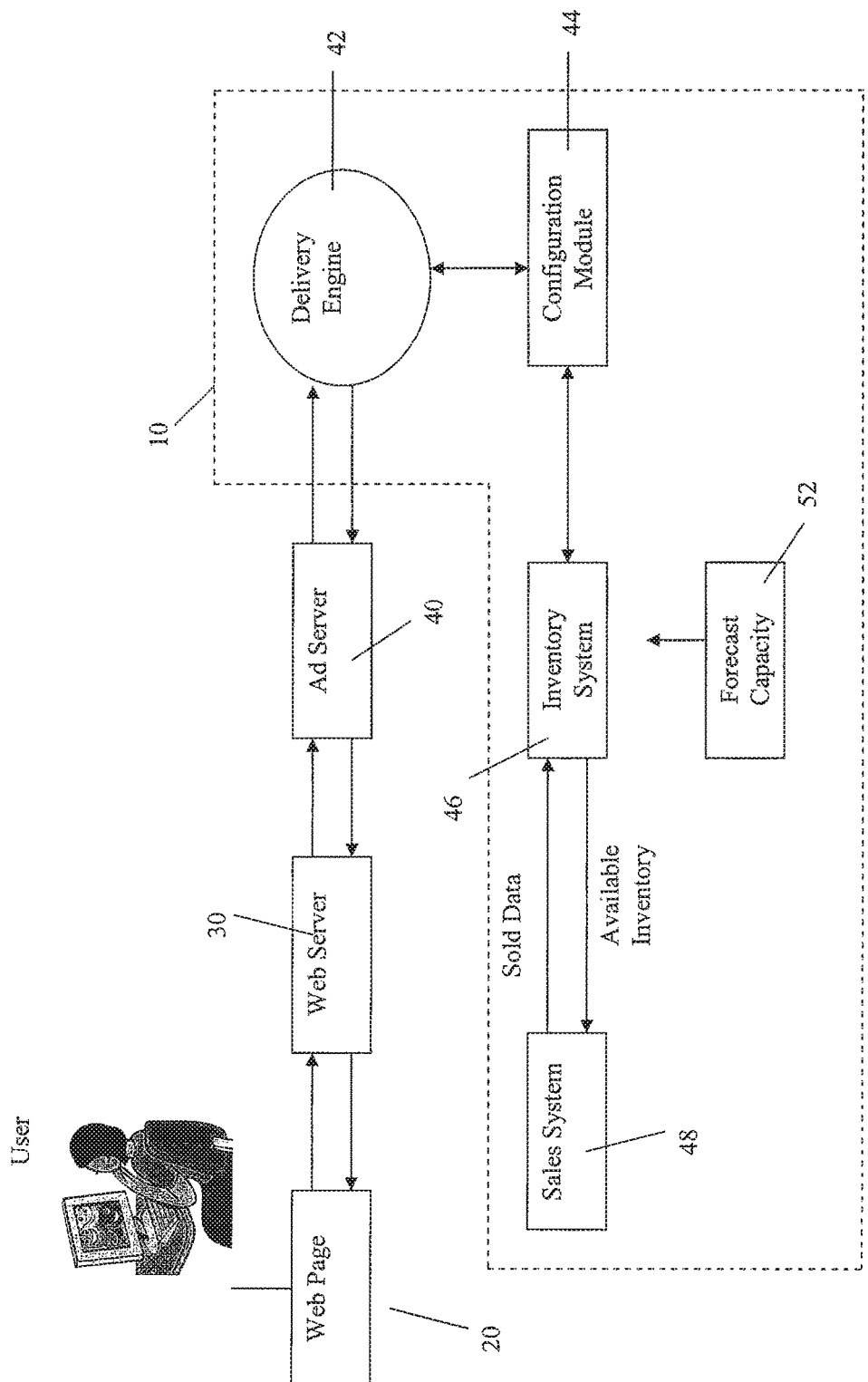
FIG. 2 is a flow chart illustrating the flow of information in an exemplary internet advertising system for use with the present invention.

An exemplary internet advertising system for use with the inventory management system is shown in FIG. 2. The webpage is accessed by a user. A user or internet user may use any system or device which may be connectable to the internet for access thereto, including, but not limited to personal computer, mobile phones, PDA, MP3 player, and the like. Generally, these devices include a graphical user interface (GUI) or a communication means by which an advertisement may be displayed or communicated. The user accesses the internet by this device and typically visits a website or webpage. When a user visits a particular website or webpage, a user essentially requests a particular page, such as a homepage. The request is provided to a web server to render this page. The images scheduled for that page at that particular time and day may be rendered to the user. The content of the webpage 20 and contact or access by a user of the webpage is generally managed by a web server 30. The web server 30 is in functional or operable communication with an ad server 40, such that it may exchange information or data with the ad server 40. To this end, the web server 30 may request an advertisement from the ad server 40 to be displayed on the webpage 20 in response to a user contact or selection on the webpage. Alternatively, the browser or webpage 20 may also request a page from the web server 30, then on receipt, may directly request one or more ads from the ad server 40 such that communication of the ad may be from or between webpage 20 and ad server 40. The foregoing systems are generally referred to, respectively, as server-side ad serving and client-side ad serving. The ad server system may or may not be inside the web server. When a web server is rendering the page, a request is made to the ad system server. The request may be specific, such as for a specific format or type of advertisement, such as a banner advertisement, for display on the webpage, or may be a general request. The advertisement may be a static advertisement, such as a picture or text advertisement, or may include or be formed of an audio component. Advertisements acceptable for use with the present invention also include video streaming, video online advertising, off-line advertising, and stored presentations such as a download onto a computer or other portable device. While any combination of ads may be available, a finite number of advertisements are provided for use on a given webpage based upon the type of advertisement, the number of advertising spaces and the number of hits or requests by a user who visits that webpage.

In response to the request to the ad system server 40, an advertisement is delivered to the web server 30 for display in the particular advertising space that meets this request. The web server 30 may then arrange the ad for placement in one of the advertising locations 22, 24, or 26 in the webpage. In particular, one advertising location may be provided for each advertisement on a webpage. More specifically, a delivery engine 42 of the ad server 40, which is a dynamic engine, may be used to interact with the user to deliver the advertisement or advertisements in response to user actions. The delivery engine 42 may be a part of the web server, or may exist as a separate component. The ad server 40 or delivery engine 42 operably or functionally communicates with the inventory management system 10 and determines which advertisement to serve or deliver given the context and parameters of the requester and any pre-defined parameters established by the inventory management system 10.

To determine which advertisement to display, the ad server 40 of an exemplary embodiment may look to the inventory management system 10, which includes the contractual obligations and available imagery for display as an advertisement. The ad server 40 may also review the properties related to the particular user based upon the request, or other gathered or stored information based upon previous activity. Based upon the relevant properties and data from the contractual obligations, the ad server 40 may determine which advertisements that are sold match the internet user and any relevant targeting properties. A decision is then made based on the relevant properties as to what advertisement to deliver. The selected advertisement, or advertisements, is delivered by the delivery engine 42 to the ad server 40, which serves the ad to the web server 30. Alternatively, the delivery engine 42 and ad server 40 may provided in a combined arrangement such as a single module which module may deliver the ad to the web server 30. The advertisement may then be placed inside of that webpage 20 for that mark up language, e.g., HTML, XML, etc., and it may return that webpage with advertisement for rendering to the user.

More specifically, as can be seen in FIG. 2, the inventory management system 10 of the ad server 40 may include or operably communicate with a delivery engine 42 that operates with a configuration module 44 to deliver advertisements. The inventory management system 10 is illustrated by dash lines representing various features contained therein, but may include additional or alternative features suitable for the purposes provided or otherwise discussed herein. The configuration module 44 handles various data and information and assists in maintaining the speed of the system. The configuration module 44 is adapted to receive information from the inventory system 46 and sales system 48 and configure the information into a useable form. In an exemplary embodiment, the configuration module 44 provides the delivery engine 42 information about what is going to happen in a given time period, for example, in a given hour. The configuration information is based on the forecast capacity of inventory, the sold data which includes sold advertisements, and any data related to the targeting parameters of the advertisement.

The configuration module 44 may be a static mechanism that operably or functionally communicates to the delivery engine 42 everything that is possible to be delivered to the particular webpage for that time period, or may be dynamic, changing the delivery schedule in response to user actions. In a dynamic inventory management system, the system may be designed to answer requests dynamically, based upon internet traffic to a particular site. For example, based upon internet traffic, some advertisements may not comply with the contractual guarantee, while some advertisements may exceed their guaranteed number of impressions. In response, some ads may be over-served, some ads may share the same spots, and some ads may be run again. The system may operate with a target number of impressions or a limitation on the number of impressions or a limitation in regards to how or to whom the ad is delivered. In each segmented time period, for instance, each day may have certain impressions available which are free or may be used in any way. Thus, based upon priorities assigned to particular advertisements, the system may fulfill one contract first. In addition, one contract may contractually require the advertisement to be scheduled over a period of time, in which case the inventory management system may pace the advertisement delivery appropriately.

In an exemplary embodiment, a website or third party sales force sells advertising space or more specifically, impressions, on one or more internet websites or webpages. Advertisers may deliver the ad content to be included in and delivered by the system to the advertising space, or may request that advertisements be prepared. Sales of advertising space typically involve contractual obligations between the website or publisher and the advertiser. Contracts for advertising space generally include a start date, an end date, and may often include a guarantee, such as, but not limited to, a number of impressions. The contract may also require a targeted delivery. However, each contract may be unique, having different terms, term lengths, and other requirements. While specific examples are provided, the variables associated with the contract terms may be ultimately unlimited.

Figure 3:
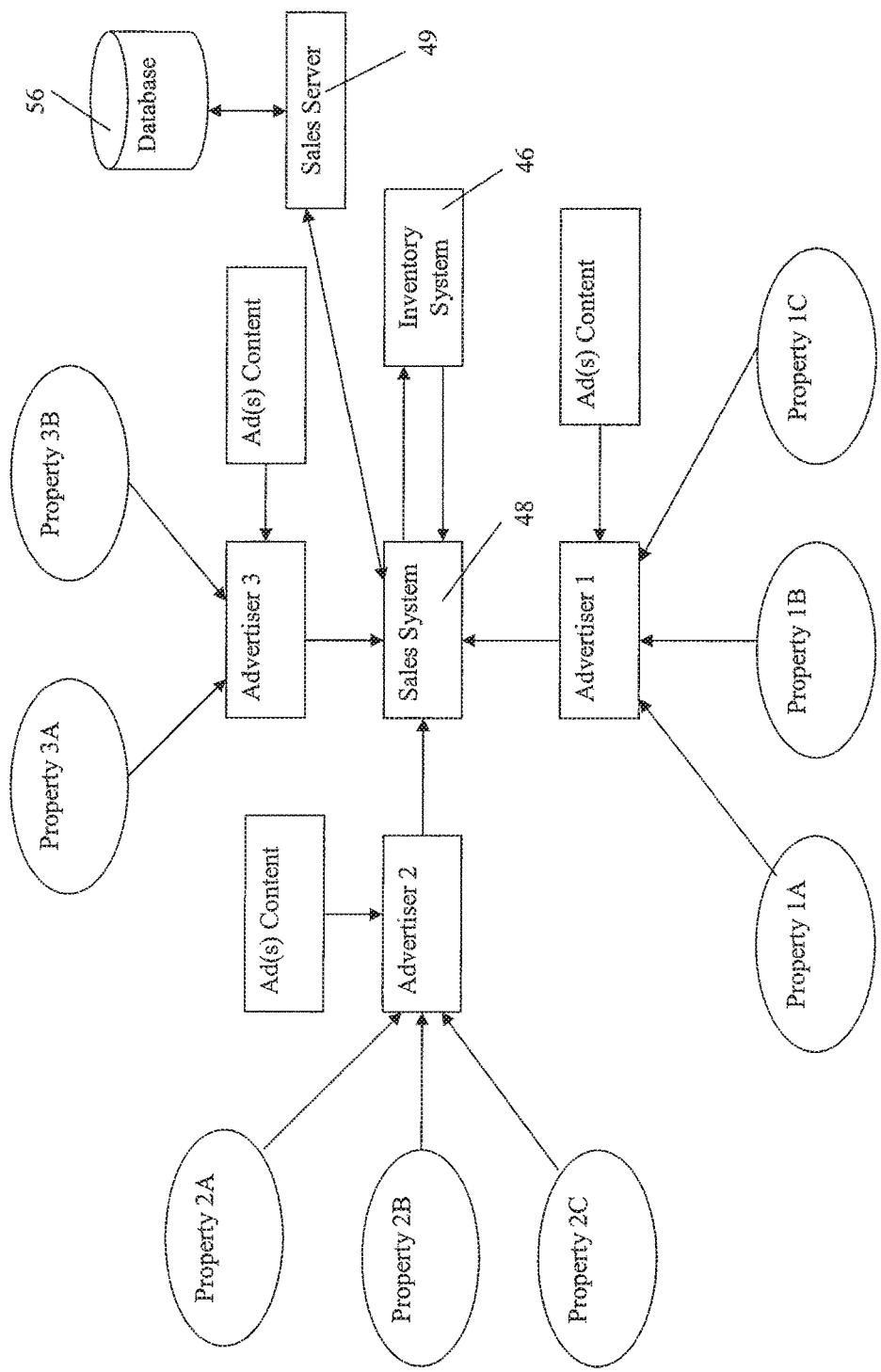
FIG. 3 is a flow chart illustrating an exemplary sales system.

Referring to FIG. 3, an exemplary sales system is provided. The sales system 48 forms a portion of the inventory management system 10 (see FIG. 2) and may be formed of a sales server 49 that is accessible by the sales force and may interact with a database 56 to store and retrieve information regarding advertising contracts. The sales system 48 may also be in functional or operable communication with the ad server 40 through the inventory system 46.

The sales system 48 collects information regarding each sale or contract in the form of sold data. The data may be entered into the system before or after the finalization or signing of the contract. Specifically, the information associated with the contract and parameters or terms of the contract are entered into the sales system and stored in a database. Sold data may be any information associated with the transaction or sale of advertising. The sold data may include general properties regarding the transaction and may include more detail and specifics, such as targeting criteria. Advertisers may request that advertisements be targeted to specific consumers or users. Likewise, target criteria may include the number of impressions per unit of time, or may be based, for example, on an algorithm for relative values established by either the system or the advertiser. As one example, the advertiser may request that advertisements be delivered only at noon on Tuesday, not at noon on Wednesday. Target properties or parameters may be defined by the contract, or may be pre-defined properties that the contract must fit within. The contract may identify the particular targeted user. For example, one or more advertisers may have a particular property to target or interest to target which may be incorporated into the sale. The contract or contracts may therefore define specific targeting properties or parameters to be used for the advertisement(s). As can be seen in FIG. 3, which presents an exemplary, simplified illustration, Advertiser 1 may request that ads or ad content be delivered according to any combination of properties 1A, 1B, and 1C. Advertiser 2 may request that ads or ad content be delivered according to any one or combination of property 2A, property 2B, or property 2C. Advertiser 3 may also require certain properties 3A and 3B for delivery of its ad content. In addition to the identified properties, specific values for these properties may be identified for targeting by the advertiser. These properties, values and ads are provided to the sales module or system 48, which may then store this information as data in a database 56.

The system matches sold data obtained from the contractual obligations to targeting parameters. Targeted internet advertising systems are capable of using any suitable parameter or criteria for targeting an advertisement. The criteria or parameters may relate to the subject matter of the website and may also relate to a user, and therefore may be dynamic or static in nature. Each user may have many properties. For instance, a registered user may be known to the system and data may be stored in the system related to that user. The system may also determine, based upon IP address and other factors, the location of the user, such as the country, state, and city of the user. It may also look to behavior or webpage requests made by that particular user to determine properties. In addition to the foregoing, exemplary targeting criteria include, but are not limited to, a country, a state, a metro location, a time of day or time period, subject matter such as website specific subject matter, and user segmentation which may include generally any property of the user and behavior. Likewise, targeting criteria may include the number of impressions per unit of time, or may include an algorithm for relative values. Sold data may also include combinations of targets. As one example, sold data may include Seattle or Portland, on the baseball section of the website, between 4:00 and 6:00 PM.

There are numerous types of targets. The type of targets or dimensions may be arranged in a tree structure or form a portion of the tree structure. For example, a dimension may be a time of day, a city, or a state. Under each dimension, many possible values may be used to target an advertisement. For example, time of day may have values for or include morning, afternoon or evening; the city dimension may include or have the values Seattle, New York, or Denver; the state dimension may have values for or include Colorado, Washington, or California. The foregoing lists are presented for purposes of example only and it is understood that any additional or alternative values may be used for the purposes provided. Additionally, for a particular dimension, combinations of features may form a value, for instance, a value may correspond to a collection of states. Thus, a number of dimensions and values may match a particular user.

Figure 4:
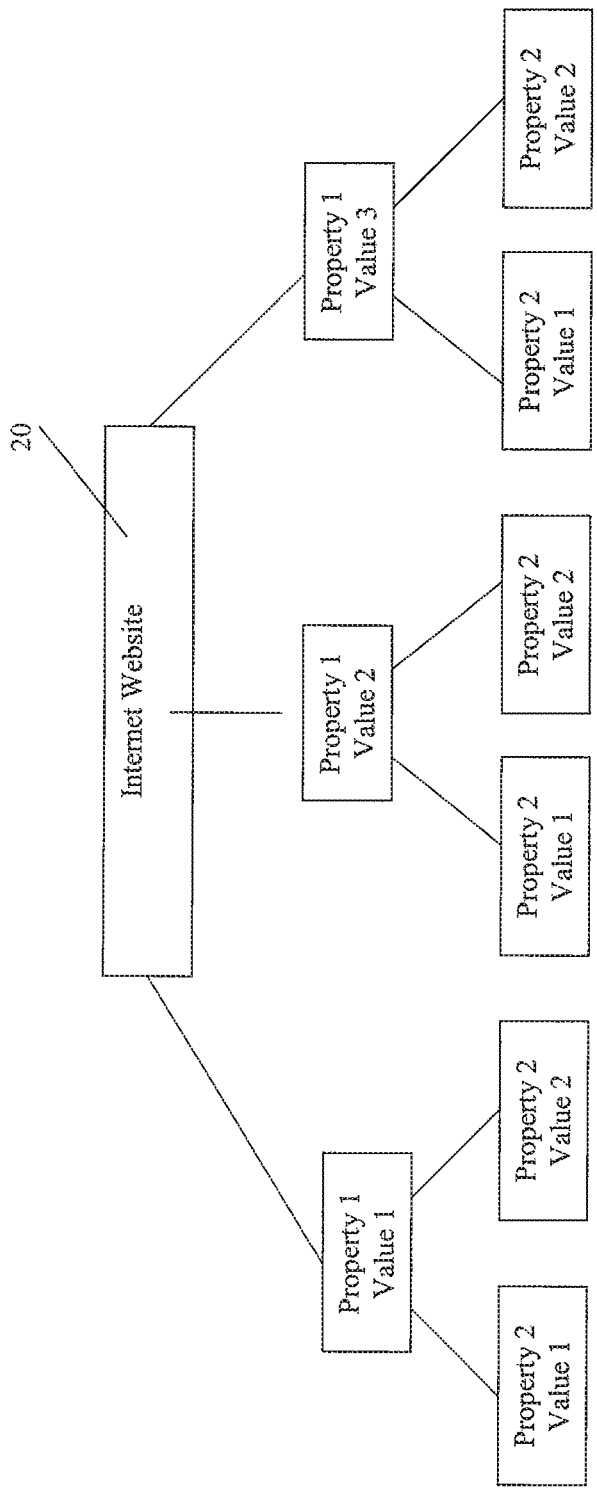
FIG. 4 illustrates an exemplary tree structure of the inventory management system.

As shown in FIG. 4, the target properties or parameters or more specifically, dimensions and dimension values are arranged into a tree structure. The system develops the tree structure of parameters or targeting criteria based upon, for example, user information and website structure. These pre-defined criteria or parameters form one or more buckets of parameters. Webpages are generally subject matter determining factors that may drive many of the targeting parameters. Any number or variation of parameters may be acceptable. Each branch of the tree represents a different targeting parameter, or subset. Each property or dimension represents context. Within the context of each property or dimension may be one or more values. Each value may represent a particular delineation of the context. For example, a property or dimension may be sports and the property values or dimension values may include basketball, baseball, hockey, football, and so forth. Any number of properties and property values may be acceptable for the purposes provided.

The tree structure shown in FIG. 4 may be based upon the website structure of a particular website 20 and further branches or separates into various nodes or subsets related to the webpage and the target parameters. At the first level of the tree structure, or the root, may be the website 20 or particular webpage. The root may be further defined by a particular parameter, such as a specific day. The second level includes nodes or sublevels, or insiders with Property 1 having Values 1, 2 and 3. These levels are further branched, such that second level for Property 1 branches into sublevels for Property 2 Values 1 and 2. Thus, Property 1 Value 1 includes branches for Property 2 Value 1 and Property 2 Value 2. Similarly, Property 1 Value 2 includes branches for Property 2 Values 1 and 2 and Property 1 Value 3 includes the same delineation of Property 2 Value 1 and Property 2 Value 2. Sublevel Property 3 (not shown) may similarly be branched from the Property 2 sublevel into various values. It is contemplated that the properties or parameters and sublevels may overlap or be mutually exclusive. Any number of properties or branches or values may be provided at any level of the tree structure. For example, a property may include values 1, 2, 3, 4, 5 . . . and so forth. Likewise, additional sublevels or properties may continue to branch as described above. Thus, any suitable number of branches or sublevels may be acceptable for purposes of the present embodiment and branching may be unlimited or limited only by the pre-defined parameters necessary for targeting of advertisements. However, in an exemplary embodiment, a tree may be optimized for performance including a selected number of branches or nodes.

Furthermore, as can be seen from FIG. 4, the same Property and Value may occur or branch from multiple locations of the tree structure. For example, Property 1 may be sports, with values for baseball, basketball and football, while Property 2 may be a "time of day" property having Value 1 as morning. The same property and value, i.e., morning, apply regardless of whether it's baseball, basketball or football.

The leaf node, or final node, of each branch includes all the properties or parameters of the levels from which it depends, including all the parameters from the root to the leaf node. Thus, in the example provided, sub-level Property 2 Value 2 may be considered a leaf node and includes the parameters associated with Property 2 Value 2 and Property 1 Value 1 and the particular internet website or root from which the branches originate.

A combination of parameters within the node of the tree structure forms a bucket including all the relevant properties up the tree. Therefore, the leaf node of Property 3 Value 2 (not shown) and the corresponding parameters from the root to that sub-level may form the parameters of the bucket. In other words, the bucket may include the context of one or more properties and the specific values for that context. One or more buckets may be formed at any branch or level/sublevel of the tree structure to define the relevant parameters. Each dimension and dimension value associated with the website can be used as targeting criteria.

An example of the foregoing may include a website (website level), which includes webpages directed to football, baseball, and basketball. Thus, a first property associated with the webpages is sports. The values associated with this first property include football, baseball and basketball. It is contemplated that these Property values may be further branched to individual teams, as additional values, such as Property Value 1A, 1B, 1C and so forth. A second property may include geography. The property values associated with this property may be particular states, cities or countries. A third property may be time of day and include specific segments of time as property values. A bucket at the leaf node may include the website, the sports value, a particular geographic location and a time of day. Furthermore, one or more buckets may overlap due to the various properties and property values used as targeting criteria. For instance, an individual may be a football fan located in California who accesses the website on Tuesday at noon every week. This user may fit three buckets in the tree.

As discussed, contracts may require an advertisement to be targeted based upon any number of parameters which are entered into the sales system as sold data. Advertisements may be mapped to or linked with specific buckets or multiple buckets. Mapping may occur based upon sold advertisement data and based upon user targeting criteria. The system determines and maps the appropriate advertisement or sold data to the bucket. Sold data may be recorded or logged into inventory. More specifically, the sold data may be generally pre-defined and may require pre-defined criteria to target ads to users. As indicated, each contract may be unique, having one or more terms which are different from any other contract. Based on these parameters, the inventory management system may map the sold data to the particular way the advertising space may be used. For instance, a contract may require an advertisement to be delivered a number of times over a period of three months. Within this three months, a flat amount of advertisements must be delivered every day to meet the guarantee in the contract. The inventory management system may map or link this data to a bucket meeting any of the other applicable requirements of the contract to make sure that the flat amount of advertisements may be met each day. The number of impressions of an advertisement may be confined to the particular bucket and may be based upon the total number of impressions available in the bucket, as well as the number of buckets that may be in use which match this contract. Each contract matching a bucket may be applied using the same calculation. Thus, the same calculation may be applied, for example, regardless of whether the contract is for a impressions to be displayed per day or per hour. In an exemplary embodiment, the tree may be analyzed in hour increments or day increments. However, as indicated above, there are numerous ways the gradation within the tree may be broken down in addition to time-based increments.

Multiple contracts may be mapped or added to the tree structure in the foregoing manner. Furthermore, each individual contract may be mapped to more than one bucket depending upon the requirements or guarantees of the contract and the contents of the bucket, which, as discussed above, may be defined based upon properties or dimensions and values for each property or dimension. Thus, at any given moment the inventory management system may have multiple contracts mapped to the various buckets of the tree. For example, a first contract may be mapped to bucket 1, bucket 2 and bucket 3, while a second contract may be mapped to bucket 1 and bucket 4 and a third contract may be mapped to buckets 1 and 2. As a result, the system may often have multiple advertisements, which are associated with the contracts, available, scheduled or ready for delivery in each bucket of the tree structure.

Advertisements of an exemplary embodiment may also be optimized for delivery. In addition to the bucket criteria, the optimization process bases a decision of which ad to deliver upon criteria or parameters such as price, inventory level, and priority. Additional parameters may be used based upon advertiser or publisher/website owner purposes. Advertisements or sold data may also be ranked according to priority based upon the contractual terms. Priority may be entered manually or may be assigned by an automated process to the sales system and associated with the sold data for that advertisement.

Using the tree structure, the inventory management system may answer virtually any query and permits precise forecasting of inventory. Distributions are also assigned to the tree for delivery of advertisements. Distribution of advertisements may therefore depend on the nature of the tree.

Generally, the system processes forecast capacity of buckets and processes sold advertisements ranked with priority, and then allocates advertisements based thereon to matched buckets. More specifically, once future capacity is forecasted for one or more buckets, an advertisement guarantee or campaign based upon the sold data may be mapped to the bucket.

More specifically, advertising space may be determined based upon the internet websites or pages associated with the system and number of advertising locations associated with each page. The number of advertisements may be further determined by forecasting traffic associated with each site or page. Forecasted traffic may be determined by reviewing historical data (such as over a pre-defined time period) and projecting out into the future, often for a time period, to determine the advertising capacity. In an exemplary embodiment, the system may review historical data, such as an internet traffic pattern within a given time period, for a given website or more specifically a webpage and any target parameter, and may project into the future a period of time. For example, the system may project eighteen months ahead of time. In a further exemplary embodiment, the system may forecast capacity for a bucket or plurality of buckets based upon the property or dimension and values therefore. Many parameters may be involved in this analysis, including the overall growth for internet traffic, how well the website has done in the past, particular events past and estimated, targeting criteria, and so forth. These parameters may be assembled together, analyzed for patterns, and used to project an inventory of possible traffic flow. This potential or possible delivery of internet traffic as discussed herein may be described as "capacity." The capacity may be determined for any time period. A rolling forecast may also be performed in which the system re-forecasts periodically. For example, the system may reforecast every day, eighteen months ahead, or may be recalculated once a week.

Figure 5:
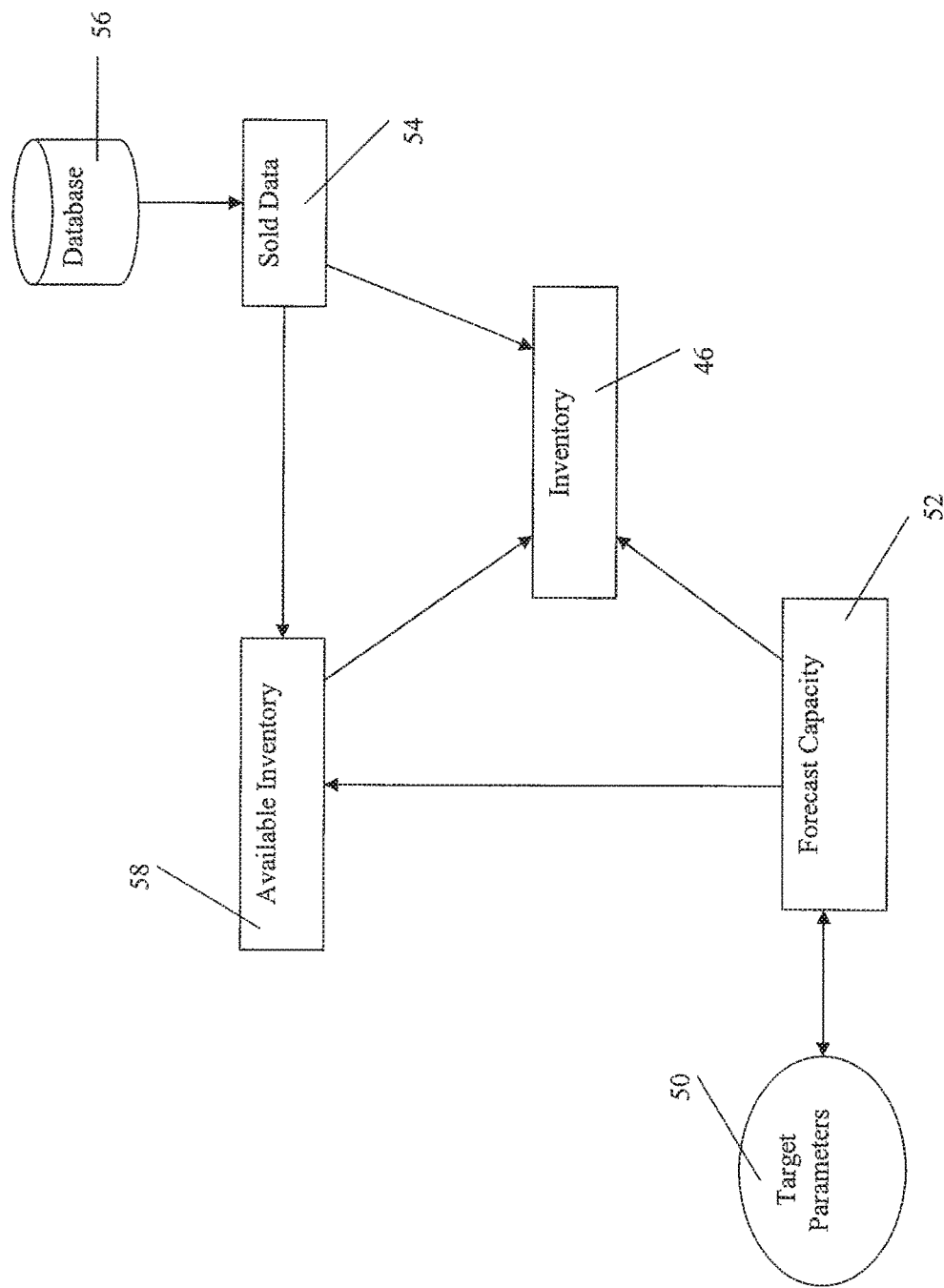
FIG. 5 is a flow chart illustrating the flow of information in the inventory management system of the present invention.

Referring to FIG. 5, the inventory management system may forecast capacity to each of the target parameters 50, and more specifically to each bucket which is defined by the property and the property values. Therefore, forecast capacity 52 may be determined for various advertising target combinations. Forecast capacity 52 may be based upon the tree structure which identifies the relevant parameters for targeting an advertisement and the number of potential impressions based upon historical data for those parameters. As the bucket may be any node of the tree structure, the forecast capacity may be determined for each target parameter combination. Capacity in inventory may be determined based, in part, upon this and may therefore be determined at any level of the targeting tree structure. Furthermore, each dimension or target property may cover the total inventory. For example, a time of day or a geographic location may apply broadly across the possible inventory and overlap. Thus, forecast capacity may provide a broad overlapping view of possible inventory.

The inventory management system 10 also functionally or operably communicates with the sales system 48, and may include sales or sold data 54. Sold data 54 may be matched to each bucket and thus the forecast capacity 52. To this end, once the forecast capacity 52 is calculated, the inventory management system 46 looks to the sold data 54 from one or more contracts. Each contract, based upon its terms, may "take away" a certain piece of the capacity, namely to take away available advertising space. Therefore, the system may note which buckets are fully used or occupied, and which have availability. As a result, the combination of the sold data from the contracts and the forecast capacity may generate available capacity.

The total inventory for the advertisement inventory management system or any one bucket may be determined by an algorithm, which at its most simplest operates to determine or calculate a forecast capacity for a given parameter or set of parameters forming a bucket, and subtract the sold advertisement data 54 or contractual obligations from that capacity to arrive at available or free capacity. As seen in FIG. 5, forecast capacity 52 may be based upon the target parameters 50 of the relevant bucket of the tree structure. The forecast capacity 52 may be combined with sold data 54 which may be pulled, for example, from a database 56, to arrive at available inventory 58. The combination of each of these categories may then be used to determine total advertising inventory for the system.

As a specific example using the sports oriented criteria of the example discussed above, a contract having targeting criteria may be entered into for 10,000,000 impressions to be delivered for a specific company over the course of 90 days. Using the forecast bucket capacity, it may be determined that 1000 impressions are available in one or more buckets. A number of those forecast impressions or more specifically impressions in the buckets match the targeting criteria established by the sold data or contract, such as, for example 500 impressions. Accordingly, 500 impressions may be applied to the forecast inventory from this contract. The inventory management system reviews this forecast capacity, reviews the sold data from the sales system, and generates an available inventory. The remaining number of impressions available in the bucket or buckets may then be filled by additional contracts meeting the criteria, or remaining impressions otherwise sold. The remaining 9,999,500 impressions guaranteed from the above example must then be mapped or linked to one or more alternative buckets matching the criteria for delivery and having available forecast capacity.

The inventory management system may re-calculate available inventory at any time for any period of time. For instance, once sold data is used or an ad is delivered, the system may calculate the left over requirements of that particular contract and the remaining capacity of the bucket. In an exemplary embodiment, the inventory management system may be re-calculated daily or weekly and may, for example, forecast out eighteen months in advance.

In operation, a user may access the internet through a wireless or hardwire connection through a personal computer, mobile device, or other electronic device with connectivity to the internet or intermittent connectivity to the internet, such as an MP3 player or the like. The device includes a computer screen for viewing a webpage or advertisement. The user enters relevant information directly or indirectly for a website.

The user, who fits one of the buckets established by the tree structure, pulls up the relevant website. Using the web server 30 and ad server 40 described herein, based upon the user request, the configuration module 44 queues the scheduled advertisements according to the tree structure of the inventory management system 10 for delivery by the delivery engine 42. The inventory management system 10 works on the delivery engine 42 so that internally, when a user clicks on the particular website 20, the website may recognize the user and user properties. The system may also apply the relevant dimension or property and dimension or property values. It reviews the advertisements for the priority ad to deliver to the user based upon this information available for the user. Then the system may query the sold data 54 to determine the advertisements that meet the priority ad requirement. As indicated, advertisements may be linked to the sold data. In other words, for each advertisement space sold, a corresponding advertisement which may be displayed in that space may be linked thereto. The system inserts one of the advertisements into the engine. The delivery engine 42 then delivers the advertisement that matches that bucket as defined by the inventory management system 10 according to an algorithm, leaving a remaining number of advertisements within the bucket for display upon additional requests. The advertisement may be delivered to the web server, placed into the webpage at the designated location and rendered for the user. Once the advertisement is delivered, a remaining reduced number of advertisements exist in inventory in that particular bucket. The system recognizes that it has fewer advertisements remaining to sell. Therefore, the system may work in real time or near real time to manage available inventory.

The sales system 48 may also be used to query the inventory management system 10. The sales system may access the inventory management system by any number of interfaces and level of access, as well as by any communication device, including online access or internet portal, direct computer access, handheld device, email request, phone request, and automated system. The interface may be wireless or hardwired. Such devices may include a computer screen or GUI device or otherwise include a communication medium for receipt of information from the inventory management system. The sales system may also include communication and reporting abilities, such that it may transmit or display the information obtained by the system. The sales system 48 may access the inventory management system 10 based upon any suitable parameters, including but not limited to, by region, as well as by team or enterprise, such as by strategy or by planning teams. Access levels may be used to control the information that may be seen or manipulated by the sales system; for example, the higher the access level, the more information that may be seen.

The sales system 48 may be used to query the inventory system to determine available inventory for fulfilling a contract, potential contract, or more specifically, the terms thereof. The inventory management system 10 may therefore be used by the sales person to query available advertising space and then use this information to sell advertisements. For example, the sales system 48 may query inventory within the inventory management system 10 for the possible delivery of advertisements in a designated window of time, such as a three-month time period to determine if a guarantee may actually be made within the contract. In response, the inventory system provides an answer based upon the forecast capacity and sold data for that designated set of pre-defined parameters, indicating the available inventory for this time period.

Thus, in an exemplary embodiment, rather than query inventory using broad terms or parameters, requests may be much more specific, focusing on the target parameters or properties and property values, or buckets. For example, a request for available inventory may be for a specific time period and limited number of states for a particular website. In response, the inventory management system reports an available inventory based upon forecast capacity for the defined buckets. The buckets, using these parameters, may be defined by the geographic area and time properties, and including the geographic area value of the combination of states and the time property value of a specific time period. The sales inquiry may occur at any level or position of the tree structure, and therefore for any bucket or combination of buckets. Sales identifies or requests parameters of the tree structure. Alternatively, the sales personnel may have a list of available parameters or pre-defined parameters, or may perform a search of the system for such parameters. The sales system may also query the tree structure with respect to these pre-defined parameters to determine available advertising space of the contract.

Decisions regarding a contract are made based on available advertising space at a particular price, and so forth. As the sales team using the inventory management system may look to all of the parameters in the system, the pre-defined parameters may be used to negotiate the contractual terms with the advertiser. The sales team may be one or more individual persons or may consist of an automated process facilitated by a computer or computer program or a combination thereof. The parameters of the bucket or buckets permit the sales system to determine whether the advertisement may be feasible and acceptable, or whether a better contract may be preferred.

In one embodiment, the inventory management system may further be used by the sales system to optimize each unit of usage. Namely, to accommodate a certain contract, other assigned advertisements may be reassigned to other buckets which fit relevant criteria. For example, a new contract may be proposed with particular targeting terms that match one bucket. Other existing advertising scheduled for within one bucket may meet the parameters of a second bucket. The existing advertising may be reassigned to the second bucket to accommodate the proposed contract. This accommodation may also occur because of a demand for display from users, such as a spike, or other internet traffic issue.

Figure 6:
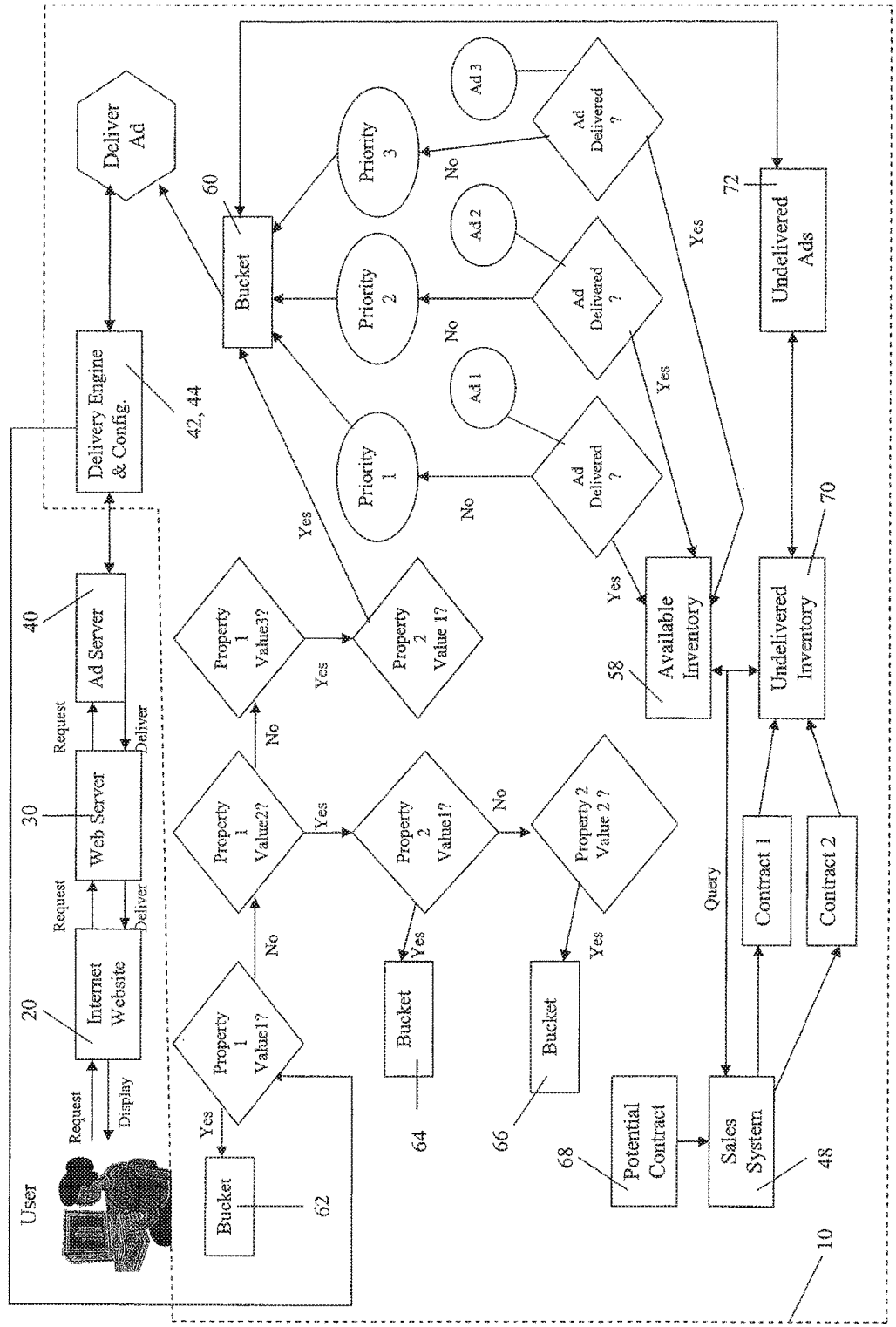
FIG. 6 is a partial functional flow diagram illustrating decisions made by an embodiment of the inventory management system in response to a request.

An exemplary illustration of the inventory management system 10 is shown in FIG. 6, which represents a partial functional flow diagram showing operation of the inventory management system. For ease of understanding, a simplified illustration is provided including only a single branch of the flow diagram that has been illustrated in some detail, and a limited numbers of users, websites, properties, property values, buckets, advertisements, contracts, and so forth have been identified. However, any number of the foregoing features may be inserted and used in the same manner.

As shown in FIG. 6, a user requests an internet website 20 by entering the relevant address into a browser. This request may be transmitted to the web server 30. The web server 30 submits the request to the ad server 40, or a request may be made from the website 20 to the ad server 40, to determine an appropriate advertisement to insert into a webpage in response to the request. The ad server 40, as discussed herein, in operation with the delivery engine 42 and configuration module 44, communicates with the inventory management system 10 to make a determination regarding an appropriate advertisement to deliver to the user. In the inventory management system 10, the user and the request are evaluated against the various parameters contained in the tree structure for that particular website 20. Thus, the user and request are compared to Property 1 Value 1. If the user matches Property 1 Value 1, then the user may be served an advertisement associated with a bucket 62 including Property 1 Value 1. The user may also be compared to Property 1 Value 2. Similarly, if the user matches Property 2 Value 2, the user may be served an ad from a bucket 64 or 66 including one or more property values within the tree structure associated with Property 2. The user may also be compared to Property 1 Value 3, and so forth. In the event the user does not match any of the properties within this particular tree structure, a second tree structure, third tree structure, and the like may be evaluated to determine an appropriate advertisement to deliver.

Assuming the user matches Property 1 Value 3, the user may be compared to the additional sub-sets, or branches, or property values branched from Property 1 Value 3. In the example provided in FIG. 6, the user may be compared to Property 2Value 1. The user may also be compared to Property 2, Property Value 2, and so forth. If the user does not match a Property Value, he or she would not match that bucket and may be evaluated in comparison to additional properties and values (not shown in FIG. 6).

Property 2 Value 1 under Property 1 Value 3 in FIG. 3 may be associated with a bucket 60 including the parameters of the internet website 20, Property 1 Value 3, and Property 2 Value 1. If the user matches these parameters, the user may be served an advertisement that matches the bucket 60. In FIG. 6, there are three potential advertisements that match and have been mapped to this bucket, namely, Ad 1, Ad 2, and Ad 3. These advertisements may also be available for delivery to one or more additional buckets not specifically illustrated in FIG. 6. Advertisements which have not yet been delivered 72 are available for delivery to the user. Thus, undelivered advertisements 72 may be provided from inventory 70 to the bucket 60 for delivery. If more than one advertisement is available, the advertisement may be delivered according to a priority determined by the contract or other controlling item. For instance, if Ad 1 has been delivered, then it would not be queued for delivery to the user and one additional space may be available in inventory. If Ad 1 has not been delivered, then that piece of inventory may be available for delivery and Ad 1 may be served to the user. The same analysis applies equally to Ad 2 and Ad 3. Those ads 72 which have not been delivered may therefore be mapped or linked to the bucket 60 that matches the parameters. The ads, as described herein, may also likely include a ranking or priority. In the illustrated example, Ad 1 has highest priority, followed by Ad 2 and then Ad 3. The higher priority advertisement may be delivered before the lower priority advertisement in this example. Therefore, Ad 1 would be served before Ad 2 or Ad 3, and Ad 2 would be served before Ad 3.

Assuming that each of Ad 1, Ad 2, and Ad 3 are available for delivery, then Ad 1 may be delivered to the user from the bucket 60. Namely, the advertisement may be delivered to the ad server 40, with the delivery engine 42 and configuration module 44, which provides the ad to the web server 30 or directly for placement into the web page. The web page may be then rendered for the user on the internet website 20. As indicated, once Ad 1 has been delivered, inventory becomes available 58. Additionally, the undelivered Ads 2 and 3 are returned to undelivered inventory 70 to be served in response to a future request. As used herein "undelivered inventory" may include sold data and advertisements that have not been delivered, which forms space in inventory that is not available for sale.

In addition, as described herein, a sales function may query the system 10 to determine available inventory 58. Specifically, as can be seen in FIG. 6, the sales system 48 may query available inventory 58 in the bucket 60, which may be determined by the total number of possible impressions available for that bucket or forecasted for that bucket, minus the un-fulfilled portions of the contracts. While bucket 60 is specifically illustrated, any bucket may be queried by the sales system 48. As indicated above, the delivery of advertisements results in advertising space or impressions that may be sold in association with a potential contract.

Upon receipt of an inquiry in association with a potential contract 68, sales, via the sales system 48, queries inventory to determine the amount of available and undelivered inventory 58, 70 in a particular bucket 60, or in other words, the number of impressions available. In the illustrated embodiment, the query is made for the available impressions in the bucket 60. The system responds to the request with the number of possible impressions available, which may be based upon the forecast capacity as described herein and the undelivered inventory 70, including both undelivered advertisements 72 for this bucket and the contracts or sold data that match this bucket.

Likewise, upon entering into a contract, the information may be entered into the sales system 48. The system 10 may map sales data associated with the contract into the appropriate bucket. In FIG. 6, Contract 1 and Contract 2 have been entered into the sales system 48 with a requirement for the delivery of impressions that correspond to this bucket 60, and may include advertisements for delivery. These contracts form undelivered inventory 70 in the bucket. The same contracts may also be mapped to additional buckets not specifically illustrated in FIG. 6.

EXAMPLES

The following examples are presented as illustrations of the advertisement inventory management system and are not intended to limit the overall scope of the present invention.

Example 1

Figure 7:
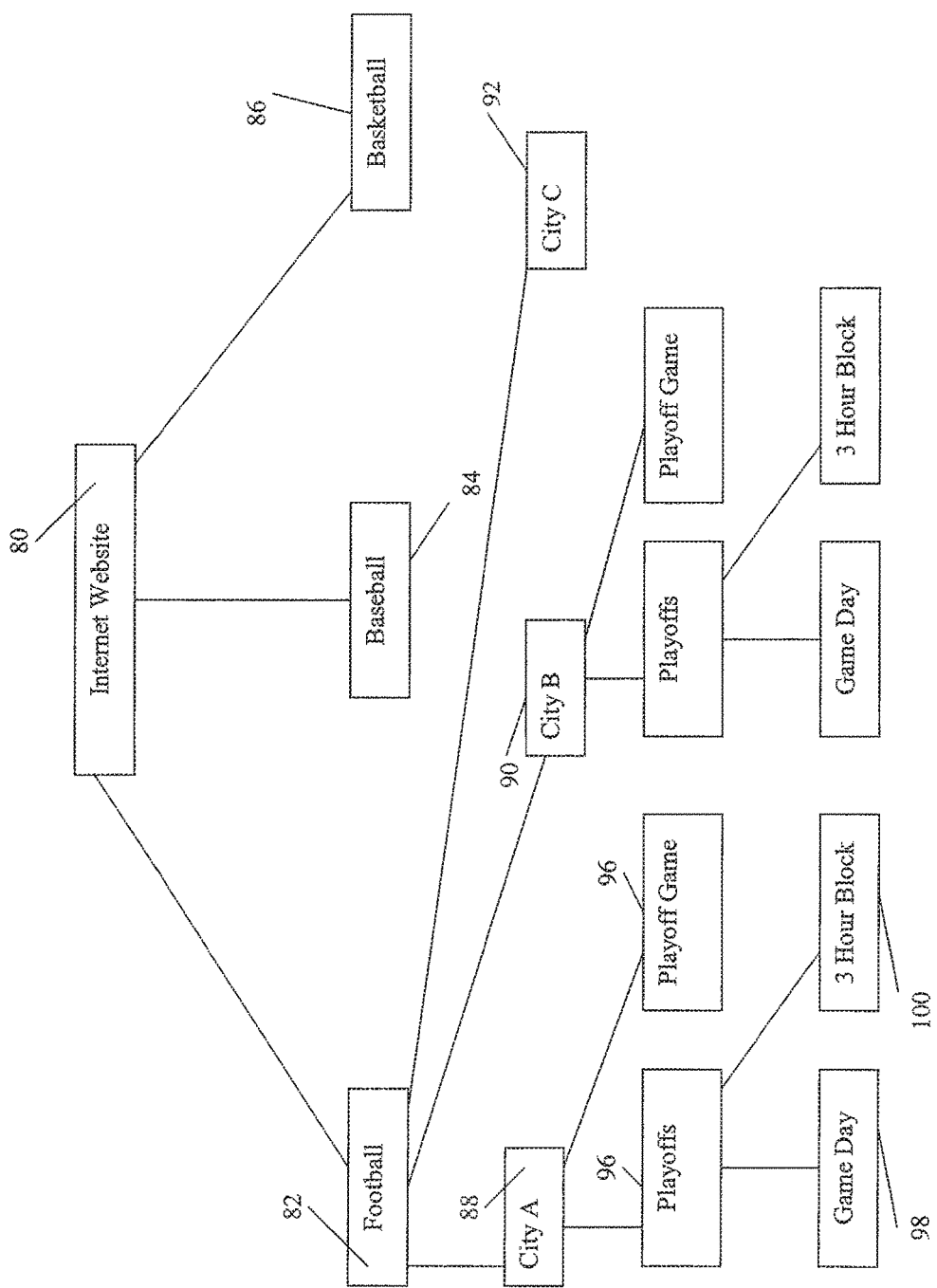
FIG. 7 is an exemplary embodiment of a tree structure as described in the Examples.

A first exemplary illustration of the inventory management system is provided. In this embodiment, the website is a sports media or sports oriented website. Thus, the context of the website, or property may be sports 79. The website 80 includes a home page with a number of subject specific links to more specific sports oriented information. For example, the home page of the website includes links to football 82, baseball 84 and basketball 86. These website links respectively form first, second and third values for the property of sports. The webpages associated with these links may include additional links to more specific subject matter (not shown). Several of these subject specific webpages may also have certain key properties, or times of day 100, or days of the week 98 in which they are accessed the most. For example, during football season, those teams in the playoffs may have a higher number of webpage hits than those teams that are not in the playoffs, and may have even higher numbers of hits on game days or at game time. Using these parameters, a second property may be a geographic location with values for City A 88, City B 90 and City C 92. A third property may include time of year and a fourth property may include time of day, with sub-sets or values for these properties identifying the particular time of year, for example the playoffs 94, and particular day and time, for example game day 98 or the three-hour block of the playoff game 100. In the internet advertisement inventory management system, this information is arranged in a tree structure as shown in part in FIG. 7. Each node of the tree forms a bucket from which advertisement capacity may be forecast.

In the sales system of the present invention, a first contract is entered into the sales system. The first contract defines various parameters for targeting advertisements. The first contract requires that 1,000 advertisements or impressions be served to the sports oriented website 80 for users who visit the webpage associated with football 82 in City A 88 during the three-hour block 100 of a playoff game. This contract is also provided with a higher priority. A second contract is entered into the sales system. The second contract also defines various parameters for targeting advertisements. The second contract requires that 5,000 advertisements or impressions be served to football fans 82 on the sports oriented website 80 in any city.

The advertisement capacity may be forecast by the system. As indicated, the second contract requires a forecast capacity for the parameters of sports oriented website 80 and more specifically football fans 82 in any city. This second contract may therefore be mapped to multiple buckets to target advertisements to football fans in any city, for example City A 88, City B 90 or City C 92. Each bucket may include the property value of football a second property value defining the buckets may be the particular city. It is determined that the total available number of impressions within the buckets is 500,000. The first contract requires a forecast capacity including the parameters of the sports oriented website 80, football 82, City A 88, playoffs 96, and a three hour block of time 100. It is determined that the available number of impressions or forecast capacity within this bucket is 10,000.

The sold data from these contracts may be then applied to the buckets. With respect to the first contract, which has higher priority than the second contract, all 1,000 impressions must be delivered within the three-hour block 100 of the playoff game. As indicated, the forecast capacity of the particular buckets that match the first contract is 10,000 impressions. Accordingly, all 1,000 impressions may be delivered and are applied to the inventory. As a result, a remaining 9,000 impressions are available within those buckets. The second contract requires that the impressions be delivered to the sports oriented website football fans in any city which includes City A 88. The bucket associated with the first contract includes a sports oriented website 80, football fans 82 and City A 88. These parameters also match the second contract. Therefore, impressions for the second contract may be used to fill the same buckets as the first contract. In fact, all 5,000 advertisements may be served in the remaining 9,000 impressions available within the buckets, or they may be divided among one or more additional buckets depending upon additional sold data or advertisements available. The remaining impressions, or available inventory, which may be, for example, 4,000 impressions in the event all 5,000 impressions of contract two are served, for the football playoff bucket, may then be sold.

Example 2

In an alternative example, the first and second contract parameters are as described in EXAMPLE 1, except that the second contract requires 25,000 impressions be delivered for the same time period. In this situation, when the forecast capacity for the bucket matching the parameters of the first contract, indicated above to be 10,000, are applied to the sold data, the inventory for these buckets may be completely sold, including the 1,000 impressions from the first contract and 9,000 impressions from the second contract. The remaining 16,000 impressions for the second contract must then be distributed within the 500,000 available impressions for the buckets that match the second contract, resulting in no available inventory for the playoff game buckets and 484,000 impressions available for the second set of buckets matching the second contract.

Example 3

In a further alternative example, the first and second contract parameters are described as provided in EXAMPLE 1. A third contract is proposed by an advertiser. The third contract, like the first contract requires that advertisements or impressions be served to the sports oriented website 80 for users who visit the webpage associated with City A 88 during the three-hour block 100 of a playoff game 96. The third contract requires that 10,000 advertisements be served. In this scenario, the third contract would be given higher priority to the playoff game buckets than the second contract, due to its narrower targeting criteria. However, using the sales system, the inventory management system may be queried and sales determines that the contract may not be guaranteed, as there are only 10,000 impressions available for the buckets matching the pre-defined parameters, and 1000 of those impressions have already been guaranteed to the advertiser for the first contract. Therefore, sales must either reject the proposed contract, or identify an alternative. In this case, it is learned that the advertiser associated with the third proposed contract is really interested in users who like team X in City A 88 in a particular state and have an interest in sports paraphernalia (not shown). The sales system queries the tree structure of the inventory management system, using these criteria which may form one or more buckets, and learns that 1,000 impressions are available in a bucket or buckets matching these parameters. Accordingly, the third contract is sold including targeting parameters which include between 7000 and 9000 impressions in the playoff buckets and up to 3000 impressions in the sports paraphernalia bucket or buckets.

Example 4

In a further alternative example, the first and second contract parameters are described as provided in EXAMPLE 1. A third contract is proposed by an advertiser. The third contract requires that advertisements or impressions be served to the sports oriented website 80 for users who visit the webpage associated with City A 88. The third contract requires that a total of 2000 impressions be delivered, wherein 500 impressions must be delivered per day during the course of four days, including the day 98 of the playoff game. During the playoff game has the highest probability that users may access the site. As a result, the third contract may be given high priority for the playoff game day, but likely second to the contract requiring delivery during the three-hour block 100 of the playoff game. Therefore, all 1000 impressions of the first contract may be mapped to inventory for the three-hour block of the playoff game bucket, which as indicated, has a forecast capacity of 10,000 impressions, reducing the number of available impressions to 9,000 impressions. Then, to take advantage of the playoff game, the 500 impressions of the third contract for that day may be mapped to the playoff game buckets which includes the criteria of third contract i.e. the three-hour block 100 is the same day as game day 98. The remaining impressions for the game may be filled by the second contract as in the previous Examples. The remaining impressions of the third contract must be then spread over the previous or subsequent days in a bucket or buckets that include one or more of the parameters associated with a sports oriented website 80 for users who visit the webpage associated with City A 88. This may include other times on game day 98 outside of the three-hour block 100. Specifically, a total of 500 impressions each day may be mapped to this bucket or buckets, or a bucket including additional sub-sets or properties and values forming the relevant parameters over a total of three additional days with high priority to ensure delivery. Accordingly, the sales system must query inventory to determine if inventory is available in these buckets over the additional time period to determine whether the contract may be guaranteed.

As can be seen from the foregoing description of exemplary embodiments, the inventory management system, due to its ability to, with a level of precision, determine available advertising space, and may be used to sell advertisements by a sales team. More specifically, in an exemplary embodiment of the advertising inventory management system, the advertisement inventory may be managed at the targeting level, thereby providing a level of precision in the determination of contractual obligations which are fulfilled as well as the advertising space available which may be guaranteed for ad delivery. The system interacts at both the user level and the sales level to direct, establish, and monitor inventory use and availability with a level of precision. Furthermore, these actions may occur in real time. Grouping inventory into targeting feature combinations permits more accurate determination of allocations precisely to the target and allows full allocation control in different types of inventory, making revenue optimization possible. It may also be used to manage the inventory of available ads for delivery. Thus the inventory management system provides a back end management system which may answer a number of questions with a level of precision. Moreover, using targeted advertising criteria or parameters, the system may look forward to the future, such as a year ahead of time, and push sold advertisements into available advertising space. Thus, the system may look at very granular segments of users to sell advertising space at a much higher CPM per day, and allowing creativity in how to manage and sell online advertising. Moreover, the system with the foregoing components enhances the effective use of available advertising space.

Although various representative embodiments of this invention have been described above with a certain degree of particularity, those skilled in the art could make numerous alterations to the disclosed embodiments without departing from the spirit or scope of the inventive subject matter set forth in the specification and claims. In some instances, in methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

Although the present invention has been described with reference to preferred embodiments, persons skilled in the art will recognize that changes may be made in form and detail without departing from the spirit and scope of the invention.

What is claimed is:

1. A method of managing advertisement inventory in an internet advertising system, the method comprising:
analyzing, by a processor, at least one of a website structure of a website and user properties of an associated targeted user;
in response to the analyzing, determining and arranging one or more targeted advertising parameters in a tree structure;
determining a plurality of buckets, wherein each bucket of the plurality of buckets is associated with at least one of the one or more targeted advertising parameters, wherein:
a first of the one or more targeted advertising parameters includes a first property having a first plurality of values associated therewith, wherein the first property and the first plurality of values correlate to a website structure, and
a second of the one or more targeted advertising parameters includes a second property associated with the targeted user, wherein the second property has a second plurality of values associated therewith;
analyzing, by the processor, historical data associated with the one or more targeted advertising parameters;
determining a forecast capacity for each bucket of the plurality of buckets;
extracting, by the processor, sold advertisement data from a plurality of contractual obligations;
mapping, by the processor, an advertisement to one or more buckets of the plurality of buckets based, at least in part, on the forecast capacity and the sold advertisement data; and
delivering, by the processor, the advertisement for display in the website on a display device associated with an internet user responsive to the internet user matching the one or more targeted advertising parameters.

2. The method of claim 1, further comprising:
wherein the historical data comprises past internet traffic to a website associated with the one or more targeted advertising parameters.

3. The method of claim 1, wherein the tree structure comprises a level of nodes and a sublevel of nodes, each node in the level of nodes associated with a different value of a first targeted advertising parameters and each node in the sublevel of nodes associated with a different value of a second targeted advertising parameter.

4. The method of claim 3, wherein each node of the sublevel nodes defines one bucket of the plurality of buckets.

5. The method of claim 1, further comprising:
associating the sold advertisement data with a bucket of the plurality of buckets; and determining an available free capacity for the bucket by subtracting the sold advertisement data from the forecast capacity.

6. The method of claim 1, further comprising:

assigning a priority to the advertisement, wherein the advertisement is delivered to the internet user based on the priority.

7. The method of claim 1, further comprising:

periodically updating the forecast capacity based on new historical data.

8. The method of claim 1, wherein the contractual obligations are associated with the one or more targeted advertising parameters.

9. The method of claim 1, wherein the targeted advertising parameters comprise number of impressions of the advertisement per unit of time.

10. The method of claim 1, further comprising:

determining whether a number of advertisements associated with a bucket of the plurality of buckets is equal to the forecast capacity of the bucket, and wherein the advertisement is associated with the bucket of the plurality of buckets responsive to determining that the number of advertisements associated with the bucket of the plurality of buckets is not equal to the forecast capacity of the bucket.

11. The method of claim 1, wherein:

a third of the one or more targeted advertising parameters includes a third property associated with the website structure, wherein the third property has a third plurality of values associated therewith, the third plurality of values representing another part of the website structure;

the third property is not a subset of the second property; and the second property and third property are arranged in a hierarchy.

\* \* \* \* \*